April 15, 1941. A. McDONALD 2,238,534
METHOD AND APPARATUS FOR MANUFACTURING CONTOURED
SHEETS FROM VULCANIZABLE MATERIAL
Filed June 6, 1938 6 Sheets-Sheet 1
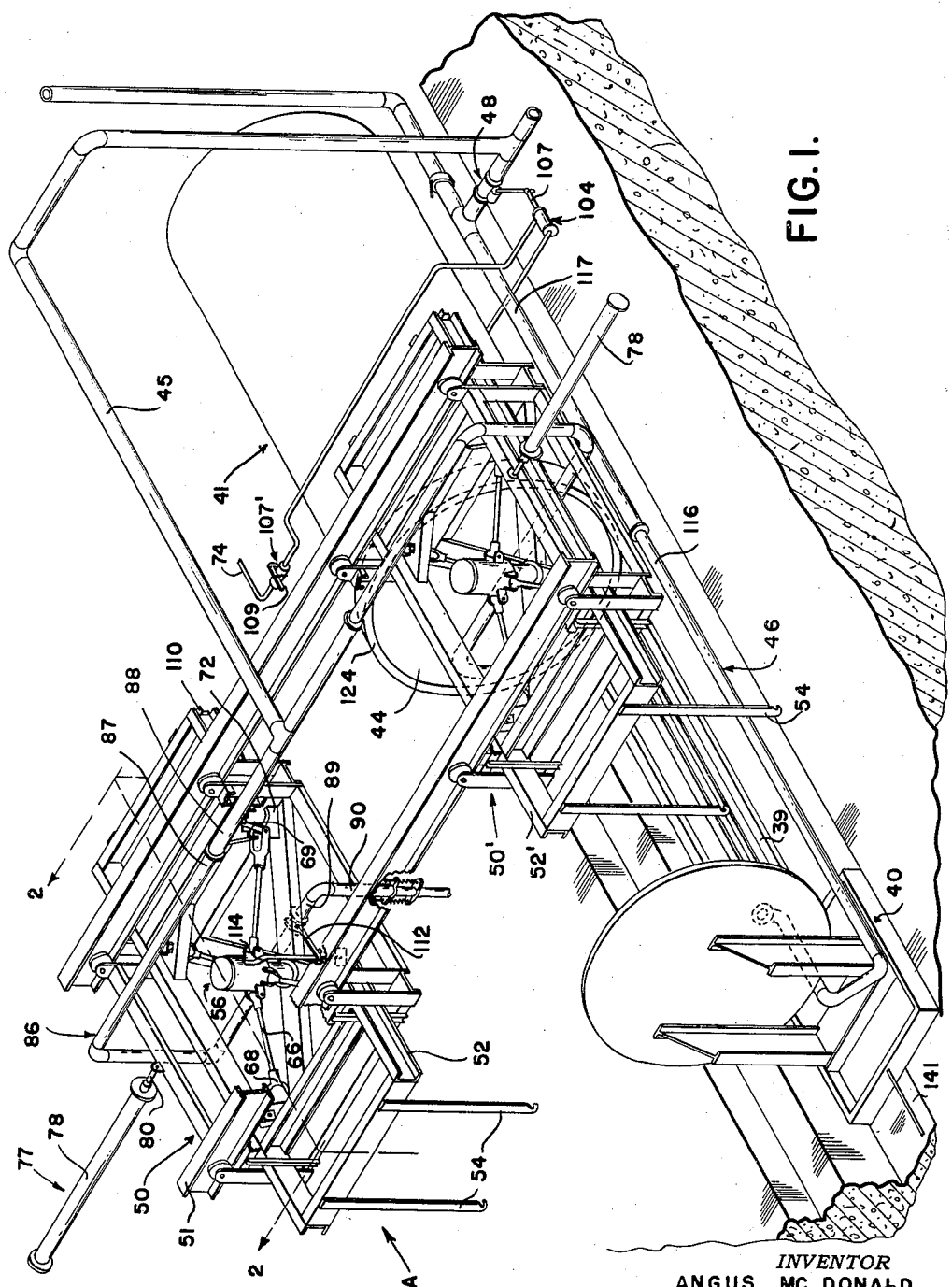
FIG. I.
INVENTOR
ANGUS McDONALD
BY
ATTORNEYS April 15, 1941.  A. McDONALD  2,238,534
METHOD AND APPARATUS FOR MANUFACTURING CONTOURED
SHEETS FROM VULCANIZABLE MATERIAL
Filed June 6, 1938  6 Sheets-Sheet 2
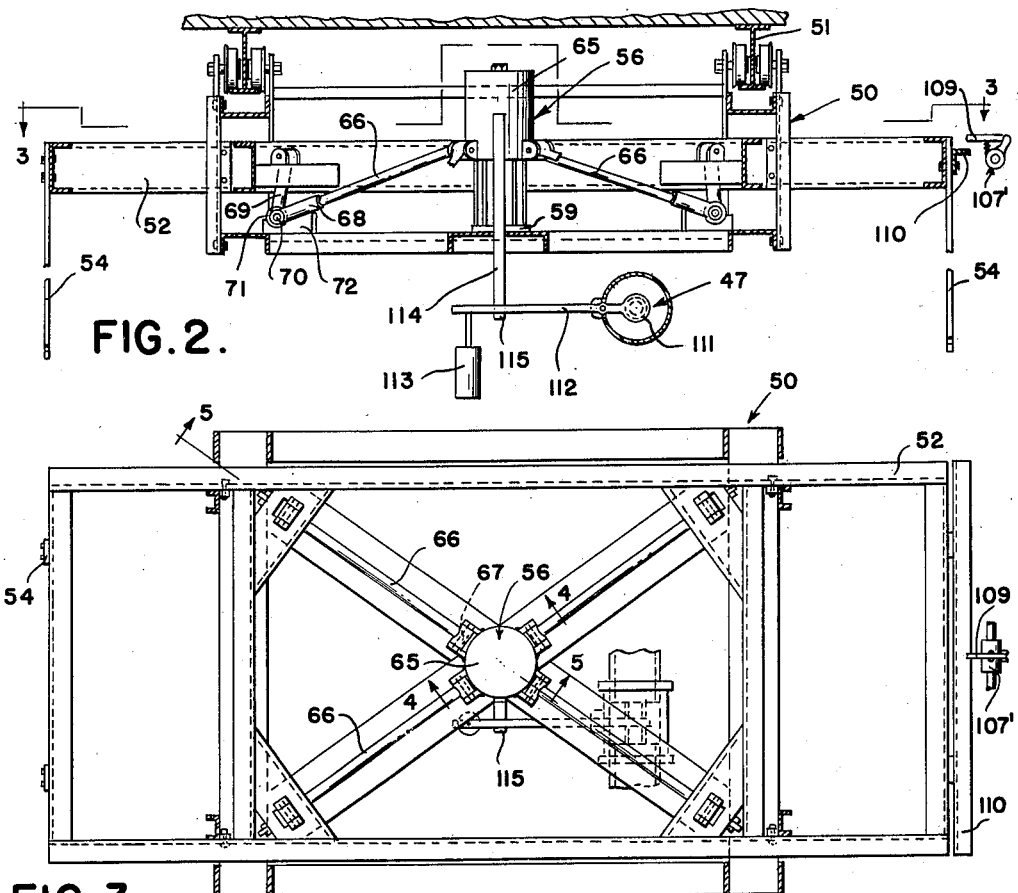
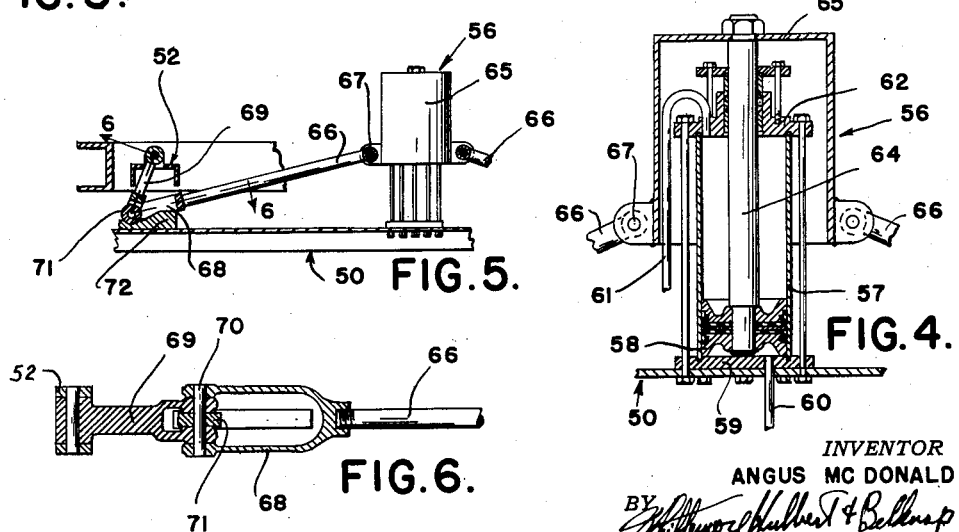
INVENTOR
ANGUS McDONALD
BY
ATTORNEYS

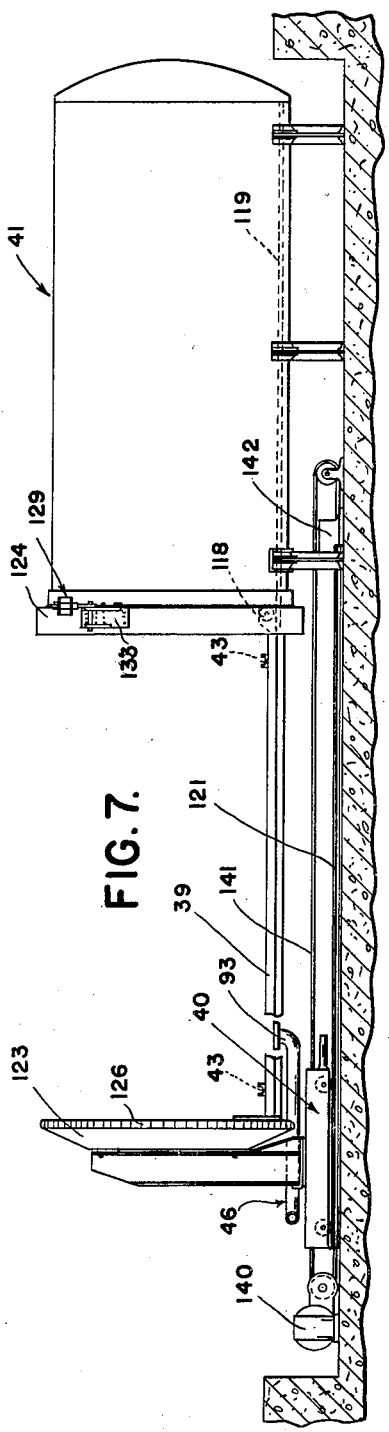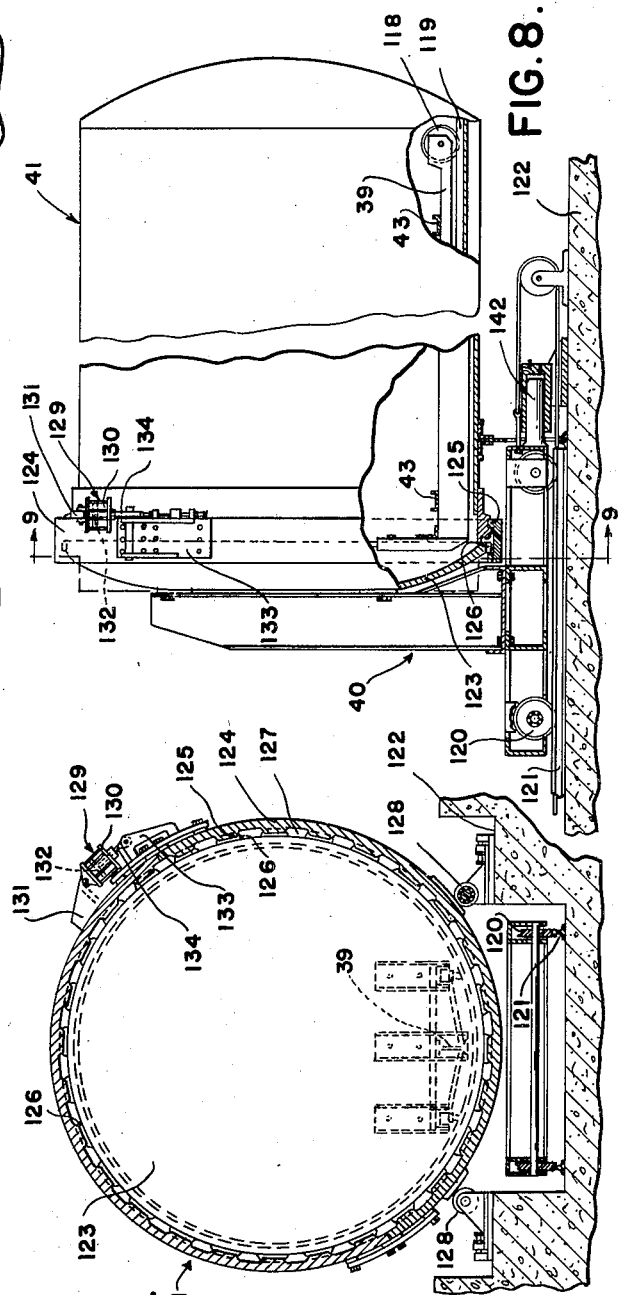

April 15, 1941.　　　　　A. McDONALD　　　　　2,238,534
METHOD AND APPARATUS FOR MANUFACTURING CONTOURED
SHEETS FROM VULCANIZABLE MATERIAL
Filed June 6, 1938　　　6 Sheets-Sheet 4
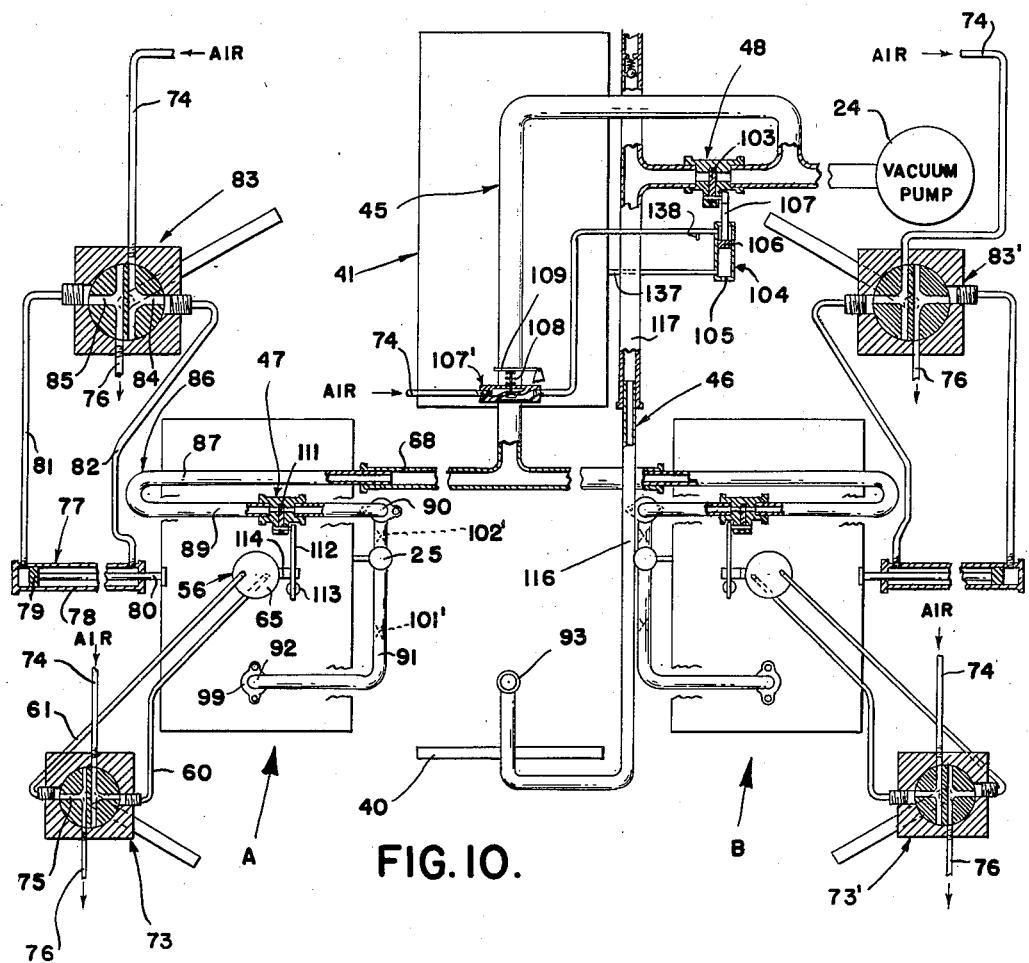
FIG. 10.
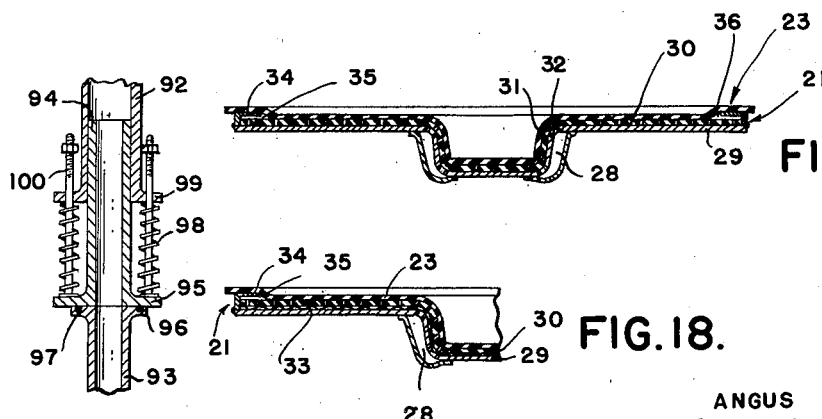
FIG. 17.
FIG. 18.
FIG. 16.
INVENTOR
ANGUS MC DONALD
BY
ATTORNEYS

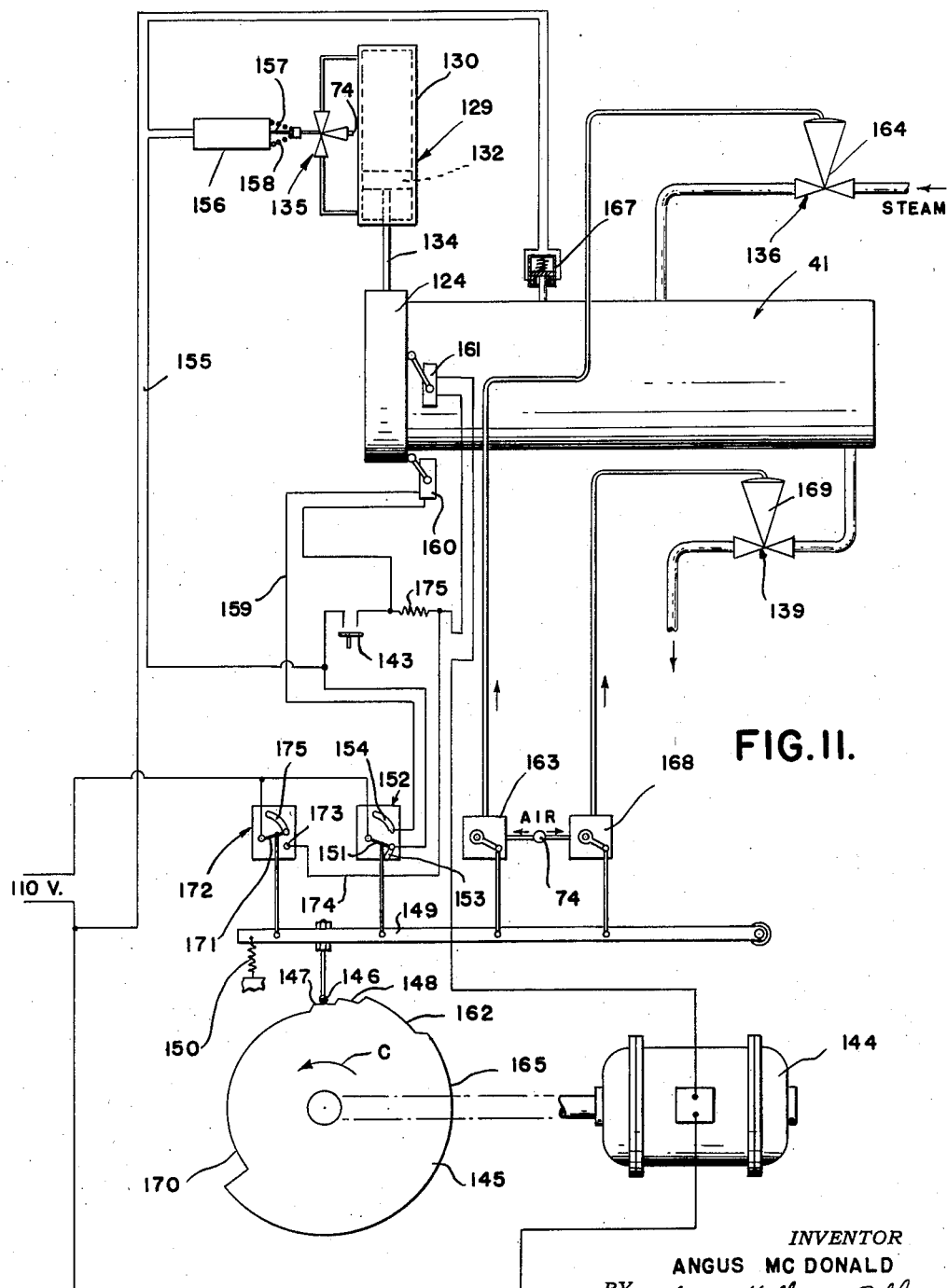

April 15, 1941.  A. McDONALD  2,238,534
METHOD AND APPARATUS FOR MANUFACTURING CONTOURED
SHEETS FROM VULCANIZABLE MATERIAL
Filed June 6, 1938   6 Sheets-Sheet 6
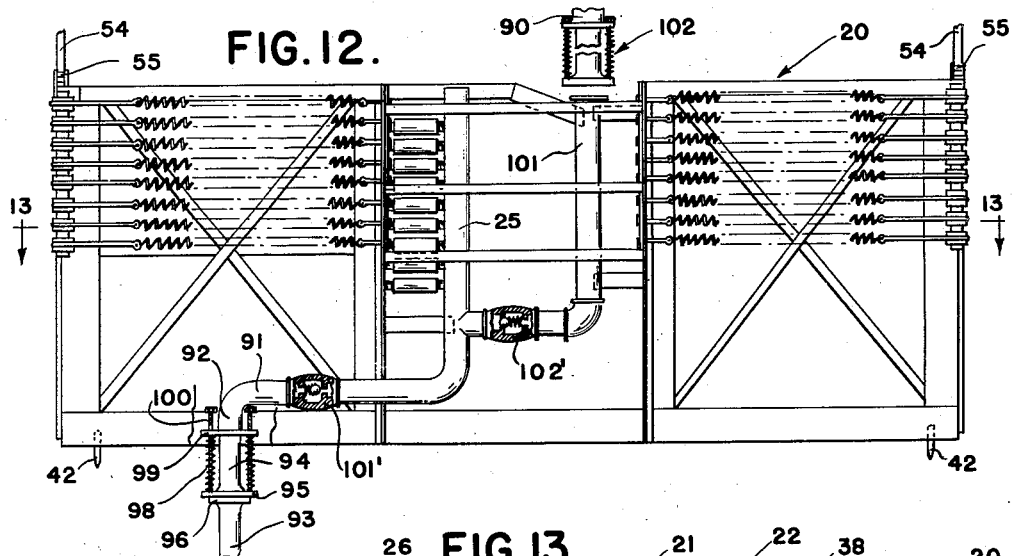
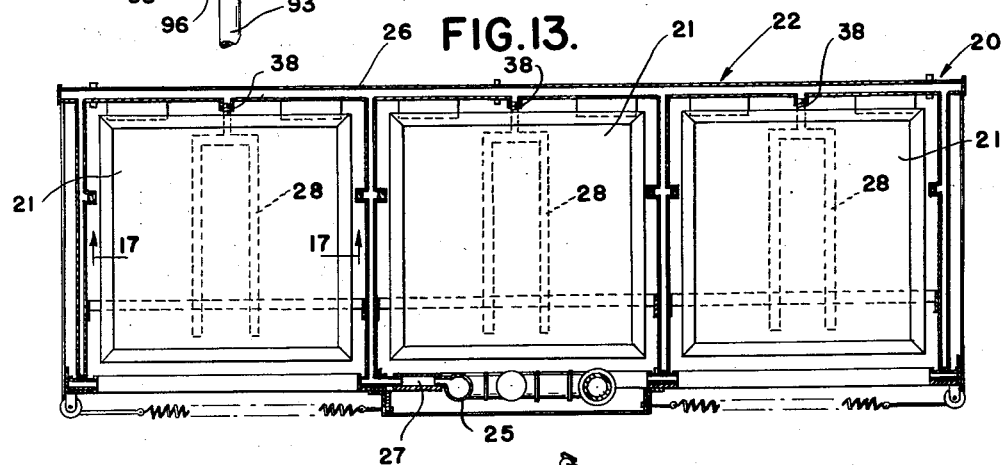
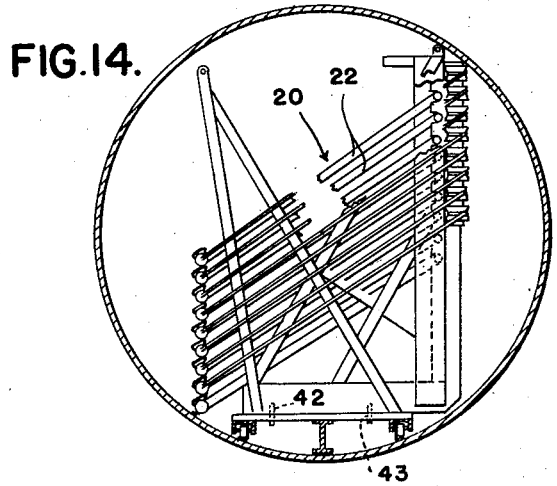
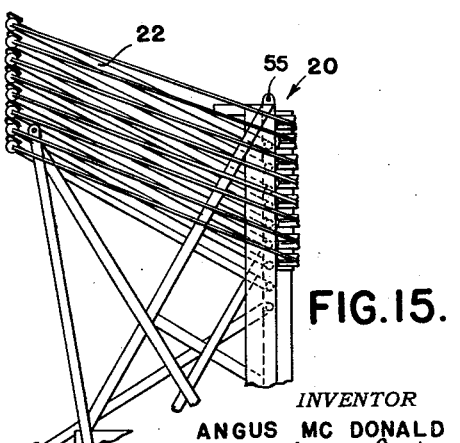
INVENTOR
ANGUS MC DONALD
BY
ATTORNEYS Patented Apr. 15, 1941

2,238,534

UNITED STATES PATENT OFFICE 2,238,534

METHOD AND APPARATUS FOR MANUFACTURING CONTOURED SHEETS FROM VULCANIZABLE MATERIAL

Angus McDonald, Pontiac, Mich., assignor to Baldwin Rubber Company, Pontiac, Mich.

Application June 6, 1938, Serial No. 212,110

24 Claims. (Cl. 18—4)

This invention relates generally to an improved method and apparatus for curing sheets of vulcanizable material to a predetermined contour.

It is one of the principal objects of this invention to simplify, render more efficient, and improve generally the method of and apparatus for manufacturing contoured coverings or mats from vulcanizable stock by providing a process composed of a relatively few simple steps capable of being expediently effected with a relatively simple inexpensive apparatus.

In accordance with this invention, a sheet of vulcanizable stock is clamped on the contoured surface of a form by differential pressure and is moved from a loading station into a heater while held in intimate contacting relation to the form by the differential pressure. After the form has been properly located in the heater, a heated fluid is discharged into the heater under pressure and this fluid acts directly on the exposed surface of the sheet to cure the latter to the contour of the form. Upon completion of the curing operation, the form is withdrawn from the heater and is returned to the loading station where the cured mat is removed therefrom.

One feature of the present invention which contributes materially in expediently manufacturing contoured sheets from vulcanizable stock consists in curing a plurality of sheets to the desired contour during one cycle of operation of the apparatus and, to this end, the invention contemplates the provision of a rack carrying a plurality of forms corresponding in number to the number of sheets to be cured and movable from a loading station located to one side of the heater to a position permitting the rack to be moved into the heater through one end of the latter.

Another advantageous feature of the present invention which contributes to expediting the method of manufacture resides in the provision of apparatus embodying two loading stations adjacent the heater and having provision at each station for alternately moving the racks from the stations to positions in operative relation to the heater. With this arrangement, one rack may be unloaded and loaded during the interval the sheets on another rack are being subjected to the curing operation in the heater.

Another object of this invention resides in the provision of a platform in the form of a car movable from a position spaced from the open end of the heater to a position within the heater and carrying a door effective in the last named position of the car to close the open end of the heater.

Still another advantageous feature of this invention resides in the provision of a transfer carriage at each loading station effective to alternately move the racks from these stations to positions above the heater door car and to lower the racks on the latter in a manner such that the racks are movable with the door car relative to the transfer carriages into the heater.

A further object of this invention resides in the provision of apparatus wherein the transfer carriages are alternately operated in timed relation to movement of the heater door car to its open position to lift the racks from the heater door car and return the same to their respective loading stations.

A still further object of this invention consists in the provision of a vacuum line associated with each transfer carriage for subjecting the undersides of the sheets to the action of a vacuum during the loading operation to effectively clamp the sheets to their respective forms and to insure intimate contact of the sheets with the contoured faces of the forms throughout the area thereof.

Still another advantageous feature of the present invention consists in the provision of means for automatically connecting the vacuum line on one transfer carriage with a vacuum line serving the forms on the associated rack prior to placing the uncured sheets on the forms and for automatically connecting the vacuum line on the rack with a vacuum line on the heater door car before the rack vacuum line is disconnected from the vacuum line associated with the transfer carriage so that the sheets are intimately held in clamping engagement with the contoured surfaces of their respective forms during the interval the latter are introduced into the heater.

In addition to the foregoing, the present invention contemplates an arrangement wherein the vacuum line on the heater door car is automatically coupled to the vacuum line on the rack before the vacuum line on the rack is disconnected from the vacuum line on the associated carriage and wherein the vacuum line on the carriage is closed after the vacuum line on the heater door car has been opened. In accordance with the present invention, the foregoing cycle of control of the vacuum is effected automatically in predetermined timed relationship, and a further feature of this invention resides in the relatively simple manner in which this is accomplished.

The foregoing, as well as other objects, will be made more apparent as this description proceeds, especially when considered in connection with the accompanying drawings, wherein—

Figure 1 is a fragmentary perspective view of my improved apparatus for carrying out the various steps of the novel method of manufacture;

Figure 2 is a sectional view taken substantially on the plane indicated by the line 2—2 of Figure 1 and showing the parts in a different position;

Figure 3 is a plan view, partly in section, of the construction shown in Figure 2;

Figure 4 is a cross sectional view taken substantially on the plane indicated by the line 4—4 of Figure 3;

Figure 5 is a sectional view taken substantially on the plane indicated by the line 5—5 of Figure 3;

Figure 6 is a sectional view taken substantially on the plane indicated by the line 6—6 of Figure 5 showing the parts in their extended position;

Figure 7 is a side elevational view of the heater showing the door car in its open position;

Figure 8 is a fragmentary side elevational view of the heater showing the door car in a position wherein the open end of the heater is closed;

Figure 9 is a sectional view taken substantially on the plane indicated by the line 9—9 of Figure 8;

Figure 10 is a semi-diagrammatic view of the apparatus having certain parts broken away for the sake of clearness;

Figure 11 is a diagram illustrating the cycle of control;

Figure 12 is a side elevational view of one of the racks upon which the various forms are mounted;

Figure 13 is a sectional view taken substantially on the plane indicated by the line 13—13 of Figure 12;

Figure 14 is a cross sectional view through the heater showing one of the racks in position in the heater;

Figure 15 is an end elevational view of one of the racks showing the form supporting trays in the position they assume before the loading operation;

Figure 16 is a sectional view illustrating one of the slip-joints used in the vacuum line;

Figure 17 is a section taken on the plane indicated by the line 17—17 of Figure 13; and Figure 18 is a sectional view illustrating a slightly modified construction of form.

Although the apparatus selected herein for the purpose of illustration has been found particularly satisfactory in carrying out the steps of the method of manufacturing contoured sheets from vulcanizable stock, nevertheless, it is to be understood that the method may be practiced with various different types of apparatus. However, it is believed that the method of manufacture will be more readily understood from a description of the operation of the apparatus selected herein to carry out the several steps of this method.

The first step in the method forming the subject matter of this invention consists in loading the rack 20, shown in Figures 12 to 15, inclusive, with sheets of vulcanizable material, and this is accomplished by merely placing the unvulcanized sheets over the forms 21 which are supported on pivotally mounted trays 22. Upon reference to Figure 13, it will be noted that each tray 22 supports three forms 21 and the top surfaces of the forms have the same or different contours, depending upon the shape it is desired to impart to the rubber sheets of vulcanizable material 23. It will be observed from Figures 12 to 15, inclusive, that the trays 22 are pivotally mounted on the rack 20 in superposed relationship for swinging movement from the position shown in Figure 14 to the position illustrated in Figure 15. At the start of the loading operation, the trays assume the positions thereof shown in Figure 15 and the operator places a sheet of uncured stock 23 on each of the forms 21 carried by the lowermost tray 22. The next adjacent tray 22 is then swung downwardly to a position in superposed relationship to the lower tray and the operator places a sheet of material 23 on each of the forms 21 carried thereby. This operation continues until all of the trays are loaded and, when this is accomplished, the trays assume the relative positions thereof shown in Figure 14 of the drawings.

The sheets of material 23 are effectively clamped to the top surfaces of the forms 21 by differential pressure at opposite sides of the sheets of material with a preponderance of pressure acting on the exposed or top surfaces of the sheets so that the latter accurately conform to the contours of the top surfaces of the forms throughout the area thereof. In the present instance, the top surfaces of the sheets of material 23 are exposed to the atmospheric pressure and the bottom surfaces of these sheets are subjected to the action of a vacuum supplied by a vacuum pump, designated in Figure 10 of the drawings by the reference character 24. During the loading operation, the suction side of the pump 24 communicates with a manifold 25 secured to the rack 20 in the manner shown in Figure 12. The manifold communicates with the interior of the hollow frame 26 of each tray through the medium of a nipple 27 supported in axial alignment with the point of swinging movement of the tray relative to the rack 20. The interior of the frame 26 of each tray 22 communicates with the joint between adjacent surfaces of the sheets of stock and forms to provide the suction pull on the sheets required to effectively clamp the same to their respective forms.

As shown in Figure 17, each form 21 comprises a supporting plate 29 corresponding in shape to the predetermined contour of the vulcanized sheet and the top surface of this plate is covered by a hard rubber sheet 30 upon which the sheet to be vulcanized is supported. The rubber covering 30 is provided with a series of apertures 31 therethrough, and these apertures communicate with the interior of a vacuum chamber 28 through openings 32 formed in the supporting plate 29. The arrangement is such that air is drawn downwardly through the apertures 31 and is caused to flow between the adjacent surfaces of the rubber covering 30 and supporting plate 29 into the vacuum chamber 28 through the openings 32 in the plate 29. Of course, the vacuum will be the strongest in the region of the openings 32 in the plate 29 and, for this reason, the location of the openings 32 and vacuum chamber 28 is predetermined to provide the greatest differential pressure at the points where the surface contour of the form changes abruptly.

In the event that it is desired to obtain a greater differential pressure without increasing the vacuum pull in the chamber 28, the construction illustrated in Figure 18 may be provided. In this construction, a screen 23 is interposed between the adjacent surfaces of the plate 29 and rubber covering 30, with the result that the passage for the air is less restricted than in the embodiment shown in Figure 17. In either case, however, the sheet 23 to be cured is effectively clamped to the rubber covering 30 by exhausting air from the chamber 28.

It may also be pointed out at this time that provision is made to effectively clamp the marginal edges of the sheet 23 to the form 21 throughout the entire extent of these edges. In accordance with the present invention, a marginal flange 34 is secured to the plate 29 in overlapping relation to the marginal edges of the covering 30. The arrangement is such that the free marginal edge portions of the sheet 23 overlap the flange 34 and the latter is positioned above the top surface of the rubber covering 30 to provide a restricted space 35. The space 35 communicates with the vacuum chamber 28 and also communicates with a space 36 formed by extending the marginal edges of the sheet 23 over the top of the flange 34. Of course, the space 36 extends around the entire marginal edge of the sheet 23 and the vacuum existing in this space insures an effective marginal seal entirely around the sheet 23. As a result, air or fluid is prevented from escaping between the sheet 23 and the adjacent surface of the form.

Upon reference to Figure 13, it will be noted that the vacuum chamber 28, associated with each form 21, is substantially U-shaped and communicates with the interior of the tubular frame 26 of the supporting tray 22 through the medium of a nipple 38. As stated above, the interior of the frame 26 for each tray 22 communicates with the vacuum manifold 25 and, since this manifold is open to communication with the suction side of the vacuum pump 24 during the loading operation, it follows that the sheets 23 are effectively clamped into engagement with the respective forms 21 by differential pressure.

The loading of the trays with sheets 23 to be vulcanized is effected at the loading station, designated in Figure 10 by the reference character A, and the next step in the method of manufacture consists in moving the rack 20 from the loading station A to a position directly above the platform 39 on the door car 40 of the heating unit 41. The heater door car 40 is in the open position shown in Figure 7 during the above operation and the rack 20 is lowered onto the platform 39 in a manner such that the dowels 42, projecting from the underside of the rack, engage in the openings 43 formed in the platform 39 to position the rack relative to the entrant opening 44 to the heater 41.

In accordance with the present invention, the vacuum pull is maintained on the sheets 23 during the interval the rack is moved from the loading station A to a position on the heater door car platform 39. As will be presently set forth, the vacuum line 45, establishing communication between the pump 24 and the distributing manifold 25 on the rack 20, is automatically disconnected from the manifold 25 upon lowering the rack on the door car platform 39. However, before the vacuum line 45 is disconnected from the distributing manifold 25 on the rack 20, this manifold is connected to a second vacuum line 46 communicating with the suction side of the pump 24 in the manner shown in Figure 10 of the drawings. It should also be noted at this time that communication through the vacuum line 45 is discontinued by closing a shut-off valve 47 in the line 45 prior to disconnecting the manifold 25 from the vacuum line 45 and communication through the vacuum line 46 is established by opening a valve 48 in this line. The valve 48 is automatically opened in dependence upon downward movement of the rack 20 to a position on the door car 40 and the valve 47 is closed after the valve 48 is opened. Inasmuch as the vacuum distributing manifold 25 on the rack 20 is operatively connected to the vacuum line 46 before the manifold is disconnected from the vacuum line 47 and in view of the fact that the valve 48 in the vacuum line 46 is opened before the valve 47 in the vacuum line 45 is closed, it follows that a vacuum pull is maintained on all of the sheets carried by the rack during the interval the latter is transferred from the loading station A to a position on the heater door car 40. As a matter of fact, the vacuum pull is maintained on the sheets through the line 46 until the rack 20 has been moved into the heater 41 by the door car 40 and the pressure of the fluid discharged into this heater becomes sufficient to close the valve 48.

Referring now more in detail to the above construction, it will be noted from Figures 1 to 6, inclusive, that the rack 20 is suspended from a transfer carriage 50 movable between the loading station A and a position directly above the door car platform 39 on tracks 51 secured to a suitable fixed support. Guided for vertical movement on the transfer carriage 50 is a floating frame 52 having hooks 54 depending from opposite sides thereof and adapted to engage suitable pins 55 secured to the rack 20 at opposite sides thereof in the manner shown in Figure 12.

The floating frame 52 on the transfer carriage 50 is moved upwardly relative to the transfer carriage to suspend the rack 20 above the flooring at the loading station A by means of a fluid pressure actuated device 56. Upon reference to Figure 4, it will be noted that the device comprises a vertical cylinder 57 secured at its lower end to the transfer carriage 50 and having a piston 58 reciprocably mounted therein. The piston 58 rests upon the bottom wall 59 of the cylinder when the floating frame 52 is in its lowermost position and the piston is moved upwardly in the cylinder 57 by fluid pressure admitted through the supply line 60 to the cylinder at the underside of the piston. The pressure in the cylinder above the piston is relieved by a conduit 61 communicating with the upper end of the cylinder 57 through the head 62 for the latter. The piston 58 is connected to the lower end of a rod 64 having the upper end projecting through the head 62 and secured to an inverted cup-shaped fixture 65. As shown in Figures 1 to 5, inclusive, a plurality of links 66 extend radially outwardly from the fixture 65 and are pivotally connected to the fixture 65 at the inner ends thereof by pins 67. Upon reference to Figure 6, it will be noted that the outer end of each link 66 is provided with a bifurcated member 68 pivotally connected to the bifurcated lower end of a link 69 having the upper end pivotally connected to the floating frame 52. Referring again to Figure 6, it will be noted that the bifurcated end 68 of each link 66 receives, between the furcations thereof, the bifurcated end of the link 69 and is pivotally connected to the latter by means of a pin 70. A roller 71 is rotatably supported on the pin 70 between the furcations of each of the links 69.

Upon reference to Figure 5, it will be noted that each of the rollers 71 engages a cam block 72 secured to the transfer carriage 50 and having the upper surface contoured in the manner clearly shown in Figure 5. As a result of the above construction, it will be noted that the piston 58 is operatively connected to the floating frame 52 through the medium of toggle linkage fulcrumed by the cam blocks 72. The contoured surface of the cam block 72 is such that upward movement of the fixture 65 by the piston 58 causes the rollers 71 to move upwardly on the cam block 72 relative to the transfer carriage 50 and effects a corresponding upward movement of the floating frame 52. Of course, downward movement of the fixture 65 by the piston 58 effects a downward movement of the floating frame 52 through the toggle linkage and cam blocks 72.

The operation of the piston 58 to effect raising or lowering of the floating frame 52 relative to the transfer carriage is controlled by a four-way valve 73, shown in the diagram illustrated in Figure 10. In the position of the valve illustrated in Figure 10, fluid pressure from the supply line 74 is admitted to the lower end of the cylinder 57 through the conduit 60 and fluid pressure in the cylinder, above the piston, is exhausted through the passage 75 in the valve 73 to the exhaust line 76. As stated above, movement of the valve to this latter position causes the floating frame 52 and associated rack 20 to move upwardly relative to the transfer carriage. Of course, when it is desired to lower the rack onto the heater door car platform 39, the four-way valve 73 is moved to its other position wherein the passage 75 in the valve establishes communication between the supply line 74 and the upper end of the cylinder 57 through the conduit 61. In this latter position of the valve, the lower end of the cylinder is connected to the exhaust line 76 through the valve and, as a result, the floating frame 52 is lowered.

It has been stated above that after the rack 20 has been loaded by the operator, the same is moved from the loading station A to a position directly above the door car platform 39. This is accomplished, in the present instance, by moving the transfer carriage 50 along the tracks 51 by a fluid pressure operated device, designated in Figure 10 by the reference character 77. In the present instance, the device 77 comprises a cylinder 78 and a piston 79 reciprocably mounted in the cylinder. The piston 79 is connected to the transfer carriage 50 by means of a connecting rod 80, and the opposite ends of the cylinder communicate with a pair of fluid pressure lines or conduits 81 and 82. The above conduits are shown in Figure 10 as alternately connected to the fluid pressure supply line 74 through the medium of a four-way valve 83 similar in construction to the four-way valve 73. In the position of the valve shown in Figure 10, fluid pressure is admitted from the supply line 74 through the passage 84 in the valve to the conduit 82, and the conduit 81 is connected through the passage 85 in the valve to the exhaust line 76. As a result, the piston 79 is moved outwardly relative to the cylinder 78 to effect a movement of the transfer carriage 50 to its loading position shown in Figure 10 and the fluid pressure in the cylinder at the outer side of the piston is exhausted through the line 76. On the other hand, when the valve 83 is moved to its other position, fluid pressure is supplied to the outer end of the cylinder 78 through the passage 85 in the valve and the inner end of the cylinder is exhausted to the line 76 through the passage 84 in the valve. As a result of the movement of the valve 83 to the last named position, the transfer carriage 50 is moved from the loading station A to a position directly above the door car platform 39.

When the rack 20 has been moved by the transfer carriage to a position directly above the door car platform 39, the four-way valve 73 is operated to lower the floating frame 52 the extent required to support the rack on the platform 39. Also, during this operation, the hooks 54 on the floating frame 52 are released from the pins 55 at opposite ends of the rack permitting the transfer carriage to be returned to the loading station A. The transfer carriage is returned to the loading station A by moving the four-way valve 83 to the position thereof shown in Figure 10.

It has been pointed out above that the vacuum pull is maintained on the sheets of stock 23 during the interval the rack 20 is moved by the transfer carriage 50 from the loading station A to a position directly above the door car platform 39. Upon reference to Figures 1 and 10, it will be noted that a vacuum line in the form of a substantially U-shaped conduit 86 is secured to the transfer carriage 50 for movement as a unit therewith. The upper leg 87 of the U-shaped conduit telescopically engages within a branch 88 of the vacuum supply conduit 45 and the lower leg 89 of the U-shaped conduit 86 is provided with a depending extension 90 adapted to communicate with the distributing manifold 25 on the rack 20. In the specific construction illustrated herein, the upper leg section 87 of the conduit 86 slides in the branch 88 of the suction supply conduit 45 in a manner to maintain communication between the two conduits during movement of the transfer carriage 50 between the loading station A and a position directly above the platform 39 on the door car 40. Inasmuch as the depending extension 90 of the lower leg 89 of the conduit 86 communicates with the distributing manifold 25 on the rack 20 during movement of the transfer carriage, it follows that the vacuum pull is maintained on the sheets 23 during movement of the carriage from the loading station A to a position directly above the door car 40.

When the floating frame 52 on the transfer carriage 50 is moved downwardly relative to the transfer carriage to position the rack 20 on the platform 39 of the door car 40, communication is established between the vacuum line 46 and the distributing manifold 25, and the latter manifold is disconnected from the extension 90 in timed relation to establishing the communication aforesaid. Upon reference to Figure 12, it will be noted that the distributing manifold 25 is provided with a lateral projecting portion 91 terminating in a depending conduit 92 positioned to register with an upwardly projecting extension 93 on the suction supply conduit 46 when the rack 20 is in a position directly above the platform 39 on the door car 40. As shown in Figure 16, the lower end of the depending extension 92 on the distributing manifold 25 is adapted to slidably receive the upper end of a conduit 94 having a radially outwardly extending flange 95 at the lower end adapted to seat upon a corresponding flange 96 projecting radially outwardly from the free end of the upwardly projecting extension 93 on the suction line 46. If desired, a sealing ring 97 may be embodied in the top surface of the flange 96 for engagement with the adjacent surface of the flange 95 to prevent the escape of fluid when communication is established between the suction line 46 and manifold 25. It will also be observed from Figure 16 that the flange 95 is adapted to be yieldably maintained into clamping engagement with the flange 96 by means of springs 98 having the lower ends abutting the upper surface of the flange 95 and having the upper ends abutting the lower surface of a flange 99 projecting radially outwardly from the depending extension 92 of the manifold 25. The springs are symmetrically arranged with respect to the slidable conduit 94 and are held in place by means of the shoulders 100. With the construction as thus far described, it will be noted that when the rack 20 is lowered on the platform 39 of the door car 40, the flange 95 on the lower end of the slidable conduit 94 abuts the flange 96 on the upper end of the extension 93 and the springs 98 are compressed as the rack 20 continues its downward movement toward the platform 39. Of course, the slidable conduit 94 moves upwardly into the depending extension 92 of the distributing manifold 25 as the rack 20 is lowered on the platform 39.

After communication has been established between the distributing manifold 25 and the suction supply line 46, the manifold is disconnected from the conduit 86 on the transfer carriage 50. Referring again to Figure 12, it will be noted that the distributing manifold 25 is provided with an upwardly projecting extension 101 and a coupling 102, similar to the one shown in Figure 16, is provided at the lower end of the depending extension 90 of the conduit 86 on the transfer carriage 50 to permit the distributing manifold to be readily connected and disconnected from the extension 86 of the supply line 45. It will, of course, be understood that the design of the coupling 102 is such as to maintain communication between the extension 101 of the distributing manifold 25 and the vacuum line 45 until the manifold is operatively connected to the vacuum line 46. During the final downward movement of the rack 20 onto the door car platform 39, the coupling 102 completely disengages from the extension 101 of the distributing manifold 25 and permits the transfer carriage 50 to be returned to the loading station A. Attention is also called to the fact that oppositely acting check valves 101' and 102' are arranged at opposite ends of the manifold 25 to alternately close said ends of the manifold when the manifold is successively connected to the vacuum lines 45 and 46.

As also pointed out above, the vacuum line 45 is closed by the valve 47 before the vacuum line 45 is disconnected from the distributing manifold 25 and after the valve 48 is operated to open communication between the vacuum line 46 and the suction side of the pump 24. The valve 48 is diagrammatically shown in Figure 10 as embodying a valve member 103 movable from the closed position shown in Figure 10 to an open position by a fluid pressure actuated device 104. This device comprises a cylinder 105 and a piston 106 operatively connected to the valve member 103 by means of a connecting rod 107. The inner end of the cylinder 104 communicates with the fluid pressure supply line 74 through the medium of a shut-off valve 107', and the arrangement is such that when this valve is opened, the piston 106 is moved outwardly relative to the cylinder 105 to locate the valve member 103 in a position wherein communication is established between the vacuum pump 24 and the supply line 46. The valve 107' is normally closed by a spring 108 and is provided with a contact arm 109 located in a position to be engaged by a trip 110, shown in Figure 3 as secured to the floating frame 52 for movement as a unit with the latter. The arrangement is such that when the floating frame 52 is lowered to position the rack 20 on the door car platform 39, the trip 110 opens the valve 107' against the action of the spring 108 and fluid pressure from the supply line 74 is admitted to the inner end of the cylinder 105. As a result, the valve member 103 is moved to its open position wherein communication is established between the suction side of the vacuum pump 24 and the suction line 46. Of course, the valve 107' is opened after the rack 20 has been lowered by the floating frame 52 the extent required to establish communication between the suction line 46 and the distributing manifold 25.

The suction line 45 is closed by the valve 47 after the valve 107' has been opened so that there will be no interruption in the vacuum pull on the sheets 23. The valve 47 is shown in Figure 10 as being identical in construction to the valve 48 and is located in the lower leg 89 of the U-shaped conduit 86. Upon reference to Figure 2, it will be noted that the valve member 111 of the valve 47 is movable between open and close positions by a pivotally mounted lever 112. The free end of the lever is weighted, as at 113, so that the valve 47 is normally urged to a position wherein communication is closed through the supply line 45. The valve 47 is held in its closed position against the action of the weight 113 by means of an arm 114 having the upper end secured to the inverted cup-shaped fixture 65 and having a hook 115 at the lower end forming a seat for the free end portion of the lever 112. Inasmuch as the fixture 65 is moved by the piston 58 as a unit with the floating frame 52, it follows that the valve 47 is operated in dependence upon movement of the floating frame 52 relative to the transfer carriage 50. The floating frame 52 of the transfer carriage is shown in Figure 2 in its lowermost position wherein the weight 113 is operated to close the valve 47. The arrangement is such that the valve 47 is closed by the weight 113 after the valve 48 is opened by fluid pressure admitted to the inner end of the cylinder 105 by the valve 107'. It may be pointed out at this time that the valve 107' is immediately closed by the spring 108 after the trip 110 has assumed the position thereof shown in Figure 2. Closing of the valve 107', however, does not change the position of the valve 48 so that when the rack 20 is supported on the platform 39, a vacuum pull is exerted on the sheets 23. The valve 47 remains closed until the floating frame 52 is again raised by the fluid pressure actuated device 56 and, at this time, the hook 115 on the bar 114 opens the valve 47 against the action of the weight 113. This operation does not occur, however, until the end of the curing cycle and will be referred to more in detail in the following description.

Assuming that the transfer carriage has been returned to the loading station A and that the rack 20 is supported on the platform 39 of the door car 40, the next operation consists in moving the rack 20 into the heater 41. The vacuum pull is maintained on the sheets 23 during movement of the rack into the heater 41. In this connection, attention is directed to Figure 10, wherein it will be noted that the vacuum supply line 46 comprises a section 116 movable as a unit with the door car 40 and having a sliding engagement within the fixed section 117 extending from the vacuum pump 24. As a result, when the door car 40 is moved toward the heater 41 from the position diagrammatically shown in Figure 10, the section 116 of the supply line 46 telescopes within the section 117 and communication is maintained. Upon reference to Figures 7 to 9, inclusive, it will be noted that the platform 39, upon which the rack 20 is supported, is fixed to the door car 40 for movement therewith as a unit and is provided with rollers 118 at the inner ends thereof engageable with suitable tracks 119 secured within the heater 41 to the bottom wall thereof. It will also be observed from the above figures that the door car 40 is provided with flanged wheels 120 engageable with tracks 121 laid upon a suitable support 122. The tracks 121 extend parallel to the tracks 119 in the heater and serve to guide movement of the door car relative to the heater. A closure 123 is secured to the door car and registers with the open end of the heater when the door car is in the position thereof shown in Figure 8. As will be observed from this latter figure, the closure 123 is locked in its closed position against the adjacent end of the heater 41 by means of an oscillatable locking ring 124. The ring 124 is supported for rocking movement on the open end of the heater 41 and is provided with a series of circumferentially spaced radially inwardly extending teeth 125 at the front side thereof. The closure 123 is provided with correspondingly radially outwardly extending teeth 126 adapted to abut the teeth 125 on the ring in one position of the latter to effect the desired locking function. It will, of course, be understood that in the other position of the ring, the recesses 127 between the teeth 125 on the ring permit the passage of the teeth 126 to a position axially beyond the inner sides of the teeth 125. The ring assumes this latter position when the door car is in its outermost position, shown in Figure 7, so that movement of the door car to its innermost position allows the teeth 126 on the closure 123 to pass between corresponding teeth on the ring 124.

The ring 124 is supported for oscillation relative to the heater 41 by means of the rollers 128, shown in Figure 9 as fixedly supported on the bed 122. The ring is rocked in opposite directions by means of a fluid pressure actuated device 129 having a cylinder 130 pivotally connected to a bracket 131 which, in turn, is secured to the heater 41. A piston 132 is reciprocably mounted in the cylinder 130 and is operatively connected to a bracket 133 by means of a connecting rod 134. The bracket 133 is suitably secured to the ring so that movement of the piston in one direction releases the ring from the closure and movement of the piston in the opposite direction locks the ring with the closure. In Figure 11 of the drawings, the fluid pressure actuated device 129 is shown diagrammatically and the operation of this device is controlled by a four-way valve 135 in a manner to be more fully hereinafter set forth. It will suffice to point out at this time that the four-way valve is automatically operated in timed relation to movement of the door car toward the heater to successively lock the closure 123 to and release the same from the heater.

After the rack 20 has been introduced into the heater 41 and the locking ring 124 is rocked to lock the closure 123 in place, a valve 136 is automatically operated by the cycle control shown in Figure 11 to admit steam under pressure into the heater 41. Upon reference to Figure 10, it will be noted that the interior of the heater 41 communicates with the outer end of the cylinder 105 beyond the piston 106 through the medium of a conduit 137. The arrangement is such that when the steam pressure becomes sufficient to hold the sheets 23 in clamping engagement with the forms 21 on the rack 20, the valve 48 is closed and the suction pull on the sheets is discontinued. In this connection, it may be pointed out that the inner end of the cylinder 105 communicates with a bleed opening 138 so that any fluid pressure trapped in the cylinder at the inner side of the piston 106 may escape.

After a predetermined interval of time elapses, the cycle control shown in Figure 11 operates to close the steam inlet valve 136 and to open the steam exhaust valve 139 to relieve the pressure in the heater 41. As will be described in connection with the operation of the apparatus, the locking ring 124 is also operated by the cycle control shown in Figure 11 to release the closure 123 whereupon the latter may be returned to the position shown in Figure 7 by closing the circuit to an electric motor 140 having a drive shaft operatively connected to the door car 40 through the medium of a cable 141.

After the rack 20 has been moved out of the heater 41 by the door car 40, the transfer carriage 50 is moved from the loading station A to a position directly above the rack and the hooks 54 are re-engaged with the pins 55 at the ends of the rack. The valve 73 is then manipulated to move the floating frame 52 upwardly relative to the carriage and thereby raise the rack 20 off the platform 39. During upward movement of the rack 20, the supply line 46 is disconnected from the distributing manifold 25 on the rack and the coupling 102 functions to connect the distributing manifold 25 with the vacuum line 45. At the same time, the valve 47 is opened against the action of the weight 113 by the bar 114 and the suction pull on the sheets is again established. As soon as the rack has been lifted off the platform 39 of the heater door car 40, the operator again manipulates the four-way valve 84 to move the transfer carriage with the rack back to the loading station A, and the operator proceeds to remove the vulcanized sheets 23 from their respective forms. In the present instance, the vacuum pull is maintained on the sheets during removal of the latter so that the rack may be reloaded as soon as the vulcanized sheets are removed from the forms.

It may be pointed out at this time that as soon as the transfer carriage 50 and associated rack 20 are moved to the loading station A, another rack is moved from a second loading station B to a position on the door car 40. The mechanism provided for moving the second rack is identical in construction and operation to the mechanism hereinbefore described in connection with the rack 20. The parts of the mechanism for handling the second rack are identified in the drawings by reference characters identical to the reference characters directed to the corresponding parts of the mechanism for handling the first rack, with the exception that they are primed. Inasmuch as the construction and operation of the mechanism for handling the second rack are identical to the mechanism for handling the first rack 20, it is not believed necessary to duplicate the description of this mechanism at this point. It will suffice to bring out that the two mechanisms are alternately operated in a manner such that while the sheets on one rack are undergoing the curing operation, the other rack is being unloaded and loaded.

*Operation*

Assuming that the rack 20 has been loaded by the operator at the loading station A and assuming that the door car 40 is in its outermost position shown in Figure 7, it will be noted that the first operation consists in manipulating the valve 83 to admit fluid under pressure into the outer end of the cylinder 77. Inasmuch as movement of the valve 83 to the above mentioned position also connects the inner end of the cylinder 77 to the exhaust line 76, it follows that the transfer carriage 50 is moved by the piston 79 from the loading station A to a position directly above the platform 39 on the door car 40. When the transfer carriage assumes the latter position, the valve 73 in Figure 10 is manipulated to admit air under pressure into the upper end of the cylinder 57 through the conduit 61 and to exhaust air from the lower end of the cylinder 57 through the conduit 60. As a result, the piston 58 in the cylinder 57 moves downwardly and effects a corresponding downward movement of the floating frame 52 to position the rack 20 on the platform 39. As the floating frame 52 is moved downwardly by the piston 58, the vacuum supply line 46 is coupled to the distributing manifold 25 on the rack and the vacuum supply line 45 is subsequently disconnected from the manifold 25. Prior to actually disconnecting the manifold 25 from the supply line 45, the valve 47 is closed by the weight 113 and the valve 107 is opened allowing fluid under pressure to enter the cylinder 105 at the inner side of the piston 106. The piston 106 is operated by the fluid pressure admitted to the inner end of the cylinder 105 to open the valve 48 and establish communication between the suction side of the pump 24 and the supply line 46. As pointed out above, the interval of operation of the valve 107 is so determined that the valve 48 is opened before the valve 47 is closed and, as a consequence, there is no interruption in the vacuum pull on the sheets 23 during the transfer interval. The operator again manipulates the valve 83 in Figure 10 to supply fluid pressure to the inner end of the cylinder 77 and to exhaust the opposite end of this cylinder. As a result, the transfer carriage is returned to the loading station A.

Upon completion of the above operations, the circuit to the electric motor 140 is closed and the door car 40 is moved toward the heater 41 until the rack 20 has assumed a position within the heater and the closure 123 seals the open end of the heater. The circuit to the electric motor 140 is then opened by suitable mechanism and the inertia of the door car is dampened by means of a check 142 shown in Figure 8 of the drawings. After the door car has been moved to its innermost position relative to the heater, the cycle control mechanism shown in Figure 11 is placed in operation by closing the switch 143. Closing of the switch 143 establishes a circuit to the electric motor 144 and the latter causes the cam disc 145 to rotate in the direction of the arrow C. Initial rotation of the cam in the direction of the arrow C moves the cam follower 146 from the position shown in Figure 11 on the land 147 to a position on the land 148. Movement of the cam follower from the land 147 to a position on the land 148 causes the operating arm 149 to swing outwardly against the action of the spring 150. As the arm 149 is moved outwardly by the cam 145 the contact arm 151 of the switch 152 is moved from a position in engagement with the contact 153 to a position in engagement with the contact 154.

Upon reference to Figure 11, it will be noted that movement of the contact arm 151 off the contact 153 opens the circuit 155 to an electromagnet 156 and de-energizes this magnet. The armature 157 of the electromagnet 156 is operatively connected to the four-way valve 135 and is operated by a spring 158 to move the four-way valve 135 to a position wherein air under pressure is admitted from the supply line 74 to the outer end of the cylinder 130, and the opposite end of the cylinder is connected to the exhaust line in order to relieve the pressure at the inner side of the piston 132. As a result, the piston 132 is moved in a direction to rock the door locking ring 124 to a position wherein the teeth 125 on the ring engage the teeth 126 on the door 123 and thereby effectively lock the door against the open end of the heater 41. In other words, the electromagnet 156 is normally energized to maintain the door locking ring in its released position and is de-energized to effect movement of the door locking ring to a position wherein it locks the heater door car closure 123 against the heater.

It may be pointed out at this time that the switch 143 is of the push button type and the circuit to the motor 144 is maintained after the switch 143 is released by the operator by means of a shunt circuit 159 closed by a limit switch 160. The limit switch 160 is normally in its open position and is closed by the door 123 when the latter is in its closed position relative to the open end of the heater 41.

In order to prevent operation of the fluid pressure actuated device 129 to move the ring 124 to its locked position until the door 123 is completely closed, provision is made herein for preventing operation of the electric motor 144 until the door 123 has assumed its closed position relative to the open end of the heater. This is accomplished, in the present instance, by locating a limit switch 161 in series with the push button switch 143. The limit switch 161 is normally in its open position and is located to be closed by the door 123 as the latter assumes its closed position relative to the open end of the heater 41.

As pointed out above, when the door 123 is moved to its closed position relative to the heater 41, the solenoid 156 is de-energized and the door locking ring is moved by the fluid pressure actuated device 126 to a position wherein it locks the door against the open end of the heater 41. The cam 145 continues its rotation in the direction of the arrow C and, in so doing, moves the follower on the next successive land, designated in Figure 11 by the reference character 162. The resulting outward movement of the operating bar 149 actuates a valve 163 to admit air under pressure to the diaphragm operated device 164. This device opens the valve 136 and allows steam under pressure to flow into the heater 41. As the cam 145 continues its rotation, the follower travels along the cam surface 165 and the length of this surface is predetermined in dependence upon the speed of rotation of the cam to provide the interval of time required to effect the cure.

It has been stated above that the interior of the heater 41 communicates with the outer end of the cylinder 105 in Figure 10 by the conduit 137 and the resulting steam under pressure to the cylinder 105 operates the piston 106 to close the valve 48. As a result, the vacuum pull on the sheets 123 is discontinued and the sheets are held in intimate contacting relation with their respective forms by the pressure of the steam in the heater.

Referring again to Figure 11, it will be noted that the interior of the heater 41 communicates with a pressure switch 167 arranged in series with the circuit 155 to the electromagnet 156 and adapted to be moved to its open position by the pressure in the heater 41. As a consequence, energization of the electromagnet 156 to move the door locking ring to its open position is prevented until the pressure in the heater 41 is relieved.

Attention may be called to the fact at this time that when the follower 146 is moved from the land 162 outwardly onto the cam surface 165, the exhaust valve 139 for the heater 41 is closed by a valve 168 operatively connected to the bar 149. The valve 168 opens communication between the air supply line 74 and a diaphragm actuated device 169 to move the exhaust valve 139 to its closed position. This operation, of course, takes place at the start of the cure and the exhaust valve remains closed until the cam 145 is moved to a position wherein the follower 146 drops onto the cam surface 170.

As the follower 146 drops from the cam surface 165 to the cam surface 170 on the cam 145, the switch arm 171 of the switch 172 is moved downwardly from the position shown in Figure 11 into engagement with the contact 173 to close the circuit 174. The circuit 174 merely shunts out the resistance 175 in the motor circuit and causes the motor to rotate the cam at a faster rate, with the result that the time interval of the cycle is reduced to the minimum.

The next operation resulting from movement of the follower inwardly to the cam surface 170 consists in moving the switch arm 151 back into engagement with the contact 153 of the switch 152. As a result of movement of the switch contact arm 151 into engagement with the contact 153, the circuit 155 to the electromagnet 156 and pressure operated switch 167 is closed through the switch 152. However, the pressure operated switch 167 is in series with this circuit and energization of the solenoid 156 to release the door locking ring 124 is prevented until the switch 167 is closed by a drop in pressure in the heater 41. This drop in pressure occurs when the valve 163 is closed by the operating bar 149 to, in turn, close the steam inlet valve 136 and when the valve 168 is subsequently operated to open the exhaust valve 139. As soon as the exhaust valve 139 is opened, the pressure in the heater 41 diminishes and the switch 167 is permitted to move to its closed position. Closing of the pressure operated switch 167 energizes the electromagnet 156 and operates the four-way valve 135 against the action of the spring 158 to cause the door locking ring to move to its released position.

As the cam 145 continues to rotate, the follower 146 moves upwardly onto the land 147 and, through the operating bar 149, moves the contact arm 171 of the switch 172 from a position in engagement with the contact 173 to a position in engagement with the contact 175. Inasmuch as the push button switch 143 is open, it follows that the operation of the motor 144 is discontinued and the cycle control is in a position for the next series of operations.

The operator then closes a circuit to the electric motor 140 to move the door car 40 to its outermost position in Figure 7 and also manipulates the four-way valve 83 in Figure 10 to return the transfer carriage 50 to a position directly over the rack 20 supported on the platform 39 of the door car. During this movement, the hooks 54, depending from the transfer carriage, engage the pins 55 so as to permit lifting the rack 20 off the door car platform 39.

The rack 20 is lifted off the platform 39 by manipulating the four-way valve 73 to raise the floating frame 52 relative to the transfer carriage 50. It will be remembered from the foregoing description that as the rack 20 is raised by the floating frame 52, the vacuum line 46 is disconnected from the manifold 25 and the supply line 45 is connected to the manifold 25. Also, the valve 47 in the vacuum supply line 45 is opened to establish a vacuum pull on the sheets 23.

After the rack has been raised by the floating frame 52, the four-way valve 83 is again operated to return the transfer carriage 50 to the loading station A. As soon as the transfer carriage 50 is positioned at the loading station A, the vulcanized mats 23 are removed from their respective forms and other sheets to be vulcanized are placed on the forms.

Upon reference to Figures 1 and 10, it will be noted that as soon as the transfer carriage 50 has been moved from a position above the platform 39 of the heater door car, the four-way valve 83' is actuated to move the transfer carriage 50' to a position wherein the rack carried by this transfer carriage is directly above the heater door car platform 39. The four-way valve 73' is then operated to lower the floating frame 52' relative to the transfer carriage 50' and thereby position the rack onto the platform 39. The rack is then moved into the heater 41 by the door car 40 and the foregoing operations are repeated. With this construction, the sheets on one of the racks may be cured during the interval that the other rack is being unloaded and loaded.

What I claim as my invention is:

1. Those steps in the method of curing vulcanizable stock to a predetermined contour which consist in placing a sheet of stock on a contoured surface of a form at a loading station, subjecting the opposite sides of the sheet to differential fluid pressures with a preponderance of the pressure acting on the exposed surface of the sheet to clamp the opposite side of the sheet to the form, introducing the form with the sheet thereon into a heater, and maintaining the action of the differential pressure on the sheet during the interval the form is moved from the loading station into the heater.

2. Those steps in the method of curing sheets of vulcanizable stock to a predetermined contour which consist in placing a sheet of stock on the contoured surface of the form, clamping the sheet against the contoured surface of the form by subjecting the side of the sheet adjacent the contoured surface of the form to the action of a vacuum, introducing the form with the sheet thereon into a heater while maintaining the vacuum pull on the surface of the sheet adjacent the form, and supplying a heated fluid under pressure into the heater to cure the sheet to the contour of the form.

3. Those steps in the method of curing sheets of vulcanizable stock to a predetermined contour which consist in placing a sheet of stock on the contoured surface of the form, clamping the sheet against the contoured surface of the form by subjecting the side of the sheet adjacent the form to the action of a vacuum, transferring the form with the sheet thereon from a loading station into a heating chamber while maintaining the vacuum pull on the surface of the sheet adjacent the form, supplying heated fluid under pressure into the heating chamber to cure the sheet to the contour of the form, and discontinuing the vacuum pull upon the sheet when the pressure in the heater becomes sufficient to effectively clamp the sheet to the form.

4. Those steps in the method of curing sheets of vulcanizable stock to a predetermined contour which consist in placing a sheet of stock on the contoured surface of a form, clamping the sheet against the contoured surface of the form by subjecting the opposite sides of the sheet to a differential pressure with a preponderance of pressure acting on the exposed surface of the sheet, utilizing the differential pressure to effect a seal between the marginal edges of the sheet and the adjacent surface of the form, transferring the form with the sheet thereon from a loading station into a heating chamber while maintaining the differential pressure on opposite sides of the sheet, and introducing heated fluid under pressure into the heater to cure the sheet to the contour of the form.

5. Those steps in the method of curing sheets of vulcanizable stock to a predetermined contour which consist in placing a sheet of stock on the contoured surface of the form, clamping the sheet against the contoured surface of the form by subjecting the side of the sheet adjacent the form to the action of a vacuum, introducing the form with the sheet thereon into a heating chamber while maintaining the vacuum pull on the surface of the sheet adjacent the form, supplying a heated fluid under pressure into the heating chamber to cure the sheet to the contour of the form, removing the form with the cured sheet thereon from the heater, and disengaging the sheet from the contoured surface of the form while maintaining the vacuum pull on the sheet.

6. In apparatus for curing a sheet of vulcanizable stock to a predetermined contour, a heating chamber having an opening, a form upon which a sheet of stock is placed, a support for the form movable into and out of the heater through opening, means subjecting opposite sides of the sheet to differential pressures with a preponderance of pressure acting on the exposed surface of the sheet to clamp the opposite surface of the sheet against the form and means operating in timed relation to movement of the form into the heater to discontinue the differential pressure on the sheet.

7. In apparatus for curing a sheet of vulcanizable stock to a predetermined contour, a heating chamber having an open end, a form having a contoured surface upon which the sheet to be cured is placed, a supporting platform for the form movable into and out of the heating chamber through the open end thereof, means subjecting opposite sides of the sheet on the form to a differential pressure with a preponderance of pressure acting upon the exposed surface of the sheet to clamp the opposite surface to the form, means for supplying heated fluid under pressure into the heater to cure the sheet to the contour of the form, and means responsive to the pressure rise in the heating chamber to discontinue the operation of the differential pressure means.

8. In apparatus for curing a sheet of vulcanizable stock to a predetermined contour, a heating chamber having an open end, a form having a contoured surface upon which a sheet of stock to be cured is placed and which is open at the top to permit the stock to be readily placed on and removed from the form, a supporting platform for the form movable into and out of the heater through the open end of the latter, suction means communicating with the joint between the stock and the contoured surface of the form, means effective during movement of the form into the heater to render the suction means operative to draw the surface of the sheet adjacent the form against the contoured surface of the form, means for introducing heated fluid under pressure into the heater in timed relation to movement of the form into the heater, and means operated by the pressure of the fluid admitted into the heater to discontinue the operation of the suction means.

9. In apparatus for curing a sheet of vulcanizable stock to a predetermined contour, a heating chamber having an open end, a form having a contoured surface upon which the sheet of stock to be cured is placed, a supporting platform for the form movable into and out of the heating chamber through the open end thereof, a door mounted on the platform and movable by the latter to close the open end of the heating chamber, means for locking the door in its closed position, and means rendered operative by movement of the door to its closed position to actuate said locking means.

10. In apparatus for curing a sheet of vulcanizable stock to a predetermined contour, a heating chamber having an open end, a form having a contoured surface upon which the sheet of stock to be cured is placed, a supporting platform for the form movable into and out of the heating chamber through the open end thereof, a door mounted on the platform and movable by the latter to close the open end of the heating chamber, means under the control of the operator for locking the door in its closed position, means for rendering said last named means inoperative until the door has assumed its closed position relative to the open end of the heater, and means operating in timed relation to locking of the door to admit a heated fluid under pressure into the heating chamber.

11. In apparatus for curing a sheet of vulcanizable stock to a predetermined contour, a heating chamber having an open end, a form having a contoured surface upon which a sheet of stock is placed, a supporting platform for the form movable into and out of the heating chamber through the open end of the latter, a door mounted on the platform and effective upon movement of the form into the heater to close the open end of the heating chamber, means for locking the door in its closed position, means operating in timed relation to locking of the door to admit a fluid under pressure into the heating chamber, means for exhausting the fluid pressure from the heating chamber after a predetermined interval of time elapses, and means responsive to the pressure drop in the heater for unlocking the door.

12. In apparatus for curing a sheet of vulcanizable stock to a predetermined contour, a heating chamber having an open end, a form having a contoured surface upon which a sheet of stock to be vulcanized is placed, a supporting platform for the form movable into and out of the heating chamber through the open end thereof, means subjecting opposite sides of the sheet of stock to differential pressures with a preponderance of pressure acting on the exposed surface of the stock during the interval the form is moved by the platform into the heating chamber, a valve controlling said differential pressures, means operating in timed relation to movement of the form into the heater to introduce a fluid under pressure into the heating chamber, and means actuated by the fluid under pressure to close the valve and discontinue the operation of the differential pressure means.

13. In apparatus for curing a sheet of vulcanizable stock to a predetermined contour, a heating chamber having an open end, a transfer carriage movable between a loading position to one side of the heating chamber to a position in registration with the open end of said chamber, a frame supported on the transfer carriage for up and down movement relative thereto, a form having a contoured surface upon which a sheet of stock to be cured is placed and carried by said frame, means for moving the transfer carriage between the two positions aforesaid, means subjecting opposite sides of the sheet of stock to differential pressures with a preponderance of pressure acting on the exposed surface of the sheet to clamp the opposite face of the sheet against the form and effective to maintain the differential pressures on the sheet during movement of the transfer carriage from the loading position to the position aforesaid in registration with the open end of the heater, means for lowering the frame in the last named position of the transfer carriage, means operating in timed relation to lowering of the frame to discontinue the differential pressure means, and means for moving said frame into the heating chamber.

14. In apparatus for curing a sheet of vulcanizable stock to a predetermined contour, a loading station and a supporting member spaced from the loading station, a transfer carriage movable between positions above the loading station and supporting member, a frame mounted on the transfer carriage for up and down movement relative thereto, a form upon which a sheet of stock to be cured is placed and supported on the frame, means for moving the transfer carriage from a position above the loading station to a position above the supporting member, differential pressure means acting during the aforesaid movement of the transfer carriage to clamp the sheet of stock to the contoured surface of the form, means for successively lowering and raising the frame to position the form on the supporting member and to raise the form off the supporting member, and means effective upon lowering the frame to discontinue operation of the differential pressure means and upon raising the frame to render the differential pressure means operative.

15. In apparatus for curing a sheet of vulcanizable stock to a predetermined contour, a supply conduit having an open end and having a valve controlling the passage of fluid therethrough, a form having a contoured surface upon which a sheet of vulcanizable stock is placed, a conduit having one end communicating with the form at one side of the sheet of stock and having the opposite end spaced from the open end of the supply conduit, means for moving the form to a position wherein the open end of the conduit on the latter registers with the open end of the supply conduit, and means responsive to registration of said conduits to open the valve in the supply line and subject the opposite sides of the sheet of stock to differential pressures for clamping the stock to the contoured surface of the form.

16. In apparatus for curing a sheet of vulcanizable stock to a predetermined contour, a heating chamber having an open end, a platform movable into and out of the heating chamber through the open end, a vacuum supply line having a section movable with the platform provided with an open end and having a valve therein controlling the vacuum pull to the line, a form having a contoured surface upon which a sheet of stock to be cured is placed, a conduit having an open end spaced from the open end of the supply line and having the opposite end communicating with the form at the side of the sheet adjacent the contoured surface of the form, means for positioning the form on the platform with the open end of the conduit on the form in registration with the open end of the supply line, means responsive to registration of the open ends of the conduit and supply line to open said valve and effect a vacuum pull on the side of the sheet adjacent the contoured surface of the form, and means operating in timed relation to the last named means for moving the platform with the form thereon into the heating chamber.

17. In apparatus for curing a sheet of vulcanizable stock to a predetermined contour, a heating chamber having an open end, a loading station positioned to one side of the heating chamber, a supporting member movable into and out of the heating chamber, a fluid pressure supply line associated with the supporting member having an open end and having a valve therein, a transfer carriage movable from the loading station to a position above the supporting member and having a conduit communicating with a second fluid supply line, a valve controlling communication through the second supply line, a form having a contoured surface upon which a sheet of stock to be cured is placed and supported on the transfer carriage for up and down movement relative thereto, a conduit on the form communicating with the form at one side of the sheet of stock and having one end registrable with the open end of the conduit on the transfer carriage and having the opposite end registrable with the open end of the supply line associated with the supporting member upon movement of the carriage from the loading station to a position above the supporting member, means for lowering the form relative to the transfer carriage in the last named position thereof to position the form on the carriage, means responsive to lowering the form relative to the carriage to disconnect the conduit on the form from the conduit on the carriage and connect the same with the open end of the supply line on the supporting member, means also responsive to lowering of the form relative to the transfer carriage to open the valve in the supply line associated with the supporting member and to close the valve in the supply line on the transfer carriage, and means for moving the supporting member and form into the heating chamber while maintaining communication between the conduit on the form and the supply line associated with the supporting member.

18. In apparatus for curing a sheet of vulcanizable stock to a predetermined contour, a heater having an open end, a platform movable into and out of the heater through the open end thereof, a vacuum supply line having a section movable with the platform provided with an open end, a valve in said supply line, a transfer carriage movable between a loading station and a position above the platform, a second vacuum supply line having a section movable with the transfer carriage and provided with an opening, a valve controlling communication through the second vacuum supply line, a form having a contoured surface upon which a sheet of stock is placed and supported on the transfer carriage for up and down movement relative thereto, a conduit communicating with the form at the side of the sheet adjacent the contoured surface of the form and having one end disconnectedly engaging the open end of the supply line associated with the transfer carriage, means for moving the transfer carriage with the portion of the supply line attached thereto to a position directly above the platform, means for lowering the form relative to the transfer carriage to a position on the platform, means responsive to lowering the form on the platform to connect the conduit on the form with the open end of the supply line on the platform and to disconnect the conduit from the portion of the second supply line on the transfer carriage, and means also responsive to downward movement of the form onto the platform to open the valve in the first supply line and close the valve in said second supply line.

19. In apparatus for curing a sheet of vulcanizable stock to a predetermined contour, a vulcanizing chamber adapted to contain a fluid under pressure and having an opening therein, a supporting member movable from a position exteriorly of the chamber to a position within the chamber through said opening, a form carried by the supporting member and having a contoured surface over which a sheet of uncured stock is placed with the side of the stock facing the form exposed, means for moving the supporting member with the form thereon into the chamber through the opening in the latter to subject the exposed surface of the stock to the pressure of the fluid in said chamber, and means operating during movement of the supporting member into the vulcanizing chamber to subject opposite sides of the sheet of stock to differential pressures with a preponderance of pressure acting on the exposed surface of the sheet to clamp the opposite face of the sheet against the contoured surface of the form.

20. In apparatus for curing a sheet of vulcanizable stock to a predetermined contour, a heater having an opening therein, a loading station positioned to one side of the heater, a supporting member positioned opposite the opening in the heater, a form having a contoured surface over which a sheet of stock to be cured is placed with the side of the stock opposite the side thereof facing the form exposed, means for moving the form from the loading station to a position directly on the supporting member, means for moving the supporting member with the form into the heating chamber to subject the exposed surface of the stock to the atmosphere in the heater, and means operating during movement of the form from the loading station to the supporting member to subject opposite sides of the sheet of stock to differential fluid pressures with a preponderance of pressure acting on the exposed surface of the sheet to clamp the opposite face against the contoured surface of the form.

21. In apparatus for curing a sheet of vulcanizable stock to a predetermined contour, a heating chamber having an opening therein, a loading station located to one side of the heater, a supporting member positioned opposite the opening in the heating chamber, a transfer carriage movable between positions above the loading station and supporting member, a frame carried by the transfer carriage and movable upwardly and downwardly relative thereto, a form having a contoured surface upon which a sheet of stock to be cured is placed and supported on said frame, means for moving the transfer carriage and frame from a position above the loading station to a position above the supporting member, means for lowering the frame in the last named position of the carriage to deposit said frame on the supporting member, means for moving the supporting member with the frame and form thereon into the heating chamber, and means operating during movement of the transfer carriage from the loading station to a position above the supporting member and also during movement of the supporting member into the heating chamber to subject opposite sides of the sheet of stock to differential pressures with a preponderance of pressure acting on the exposed surface of the sheet of stock to clamp the opposite surface against the form.

22. In apparatus for curing a sheet of vulcanizable stock to a predetermined contour, a heating chamber having an open end, a loading station located to one side of the heating chamber, a supporting member movable from a position exteriorly of the heating chamber to a position within the latter through the open end of said chamber, a form having a contoured surface upon which a sheet of stock to be cured is placed and movable from a position at the loading station to a position on the supporting member, means for moving the supporting member with the form thereon into the heating chamber through the open end of the latter, means operating during movement of the form from the loading station to a position within the heating chamber to subject opposite sides of the sheet of stock to differential pressures with a preponderance of pressure acting on the exposed surface of the sheet to clamp the opposite face against the contoured surface of the form, means for introducing fluid under pressure into the heating chamber, and means operating in timed relation to the last named means to render the differential pressure means inoperative.

23. In apparatus for curing a sheet of vulcanizable stock to a predetermined contour, a heating chamber having an open end, a loading station located to one side of the heating chamber, a supporting member movable from a position exteriorly of the heating chamber to a position within said chamber through the open end thereof, a transfer carriage movable from a position at the loading station to a position over the supporting member when the latter is in a position exteriorly of the heating chamber, a frame mounted on the transfer carriage for movement upwardly and downwardly relative to the transfer carriage, a plurality of forms mounted on the frame one above the other and each form having a contoured surface upon which a sheet of uncured stock is adapted to be placed, means for moving the transfer carriage with the frame thereon from a position at the loading station to a position directly above the supporting member, means for lowering the frame relative to the transfer carriage to deposit said frame on the supporting member, means for moving the supporting member with the frame thereon into the heating chamber through the open end thereof, and means operating in timed relation to movement of the supporting member into the heating chamber to supply fluid under pressure into said chamber.

24. Those steps in the method of curing sheets of vulcanizable stock to a predetermined contour which consist in placing a sheet of stock on the contoured surface of the form, subjecting opposite sides of the sheet to a differential pressure with a preponderance of the pressure acting on the exposed surface of the sheet to clamp the opposite surface of said sheet against the form, transferring the form with the sheet thereon into a heating chamber while maintaining the action of the differential pressure on the sheet, introducing a heated fluid under pressure into the heating chamber against the exposed surface of the sheet of stock to cure said sheet to the contour of the form, and discontinuing the differential pressure acting on the sheet when the pressure of the heated fluid applied to the exposed surface of the sheet in the chamber becomes sufficient to effectively clamp the sheet to said form.

ANGUS McDONALD.